United States Patent [19]

Ratte

[11] 4,145,833
[45] Mar. 27, 1979

[54] ATTACHMENT FOR FISHING LINES

[75] Inventor: Robert W. Ratte, North Oaks, Minn.

[73] Assignee: Water Gremlin Company, White Bear Lake, Minn.

[21] Appl. No.: 762,500

[22] Filed: Jan. 26, 1977

[51] Int. Cl.² .............................................. A01K 95/00
[52] U.S. Cl. .................................. 43/44.89; 43/44.91
[58] Field of Search .................. 43/44.89, 44.9, 44.91, 43/44.92, 44.95, 44.96, 44.88

[56] References Cited

U.S. PATENT DOCUMENTS

| 3,019,545 | 2/1962 | Long | 43/44.89 |
| 3,974,591 | 8/1976 | Ray | 43/44.91 |

FOREIGN PATENT DOCUMENTS

| 1097823 | 7/1955 | France | 43/44.89 |
| 77341 | 1/1962 | France | 43/44.88 |

Primary Examiner—Louis G. Mancene
Assistant Examiner—Robert P. Swiatek
Attorney, Agent, or Firm—Jacobson and Johnson

[57] ABSTRACT

An attachment for a fishing line which comprises an elongated sinker for locking onto a fishing line. The interior of the sinker contains members which lockingly grasp the fishing line and the exterior of the fishing line sinker comprises an elongated member having a streamlined shape. The sinker body can be mounted on the fishing line so the sinker body remains symmetrical with respect to the fishing line to thereby produce a weedless sinker that is always in alignment with the fishing line.

1 Claim, 11 Drawing Figures

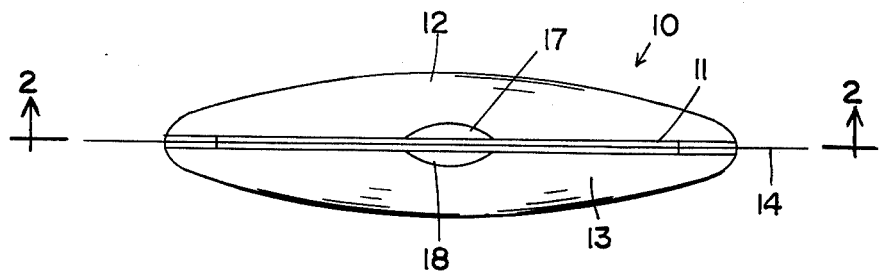
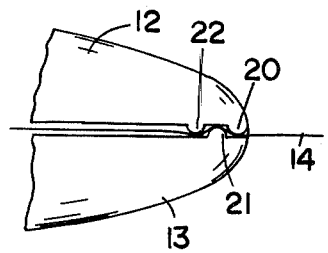
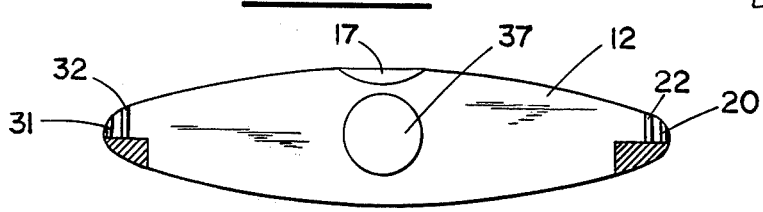
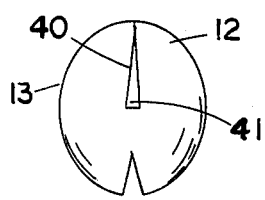
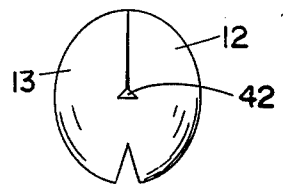
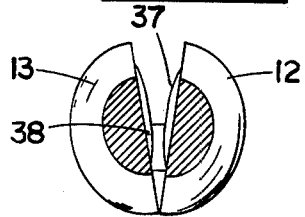

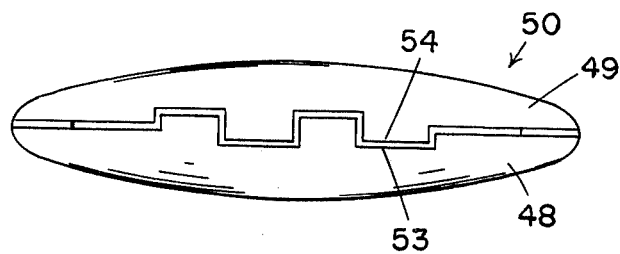
FIG. 7
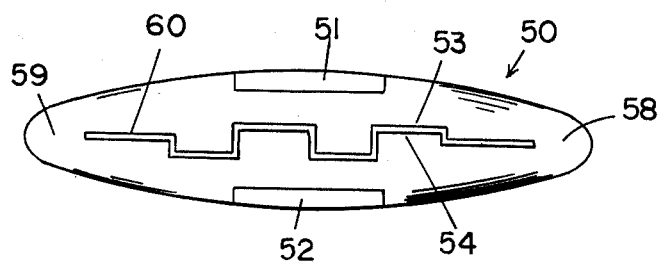
FIG. 8
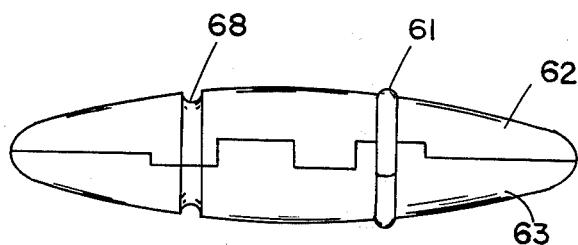
FIG. 9
FIG. 11
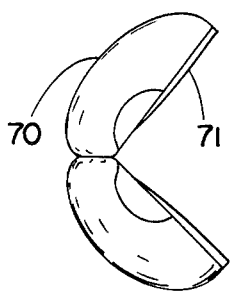
FIG. 10
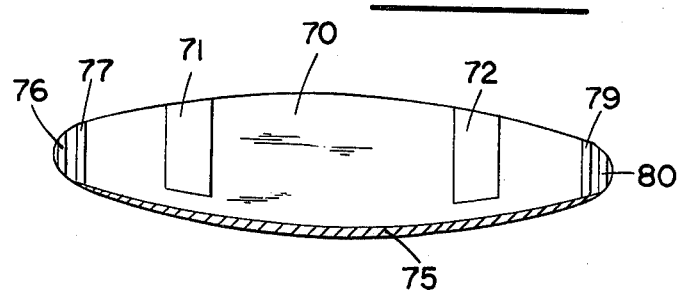

ATTACHMENT FOR FISHING LINES

BACKGROUND OF THE INVENTION

1. Field of the Invention

This invention relates generally to an attachment to fishing lines and more specifically, to improvements of a means for attaching sinkers to fishing lines.

2. Description of the Prior Art

The fishing sinker and fishing industry has grown vastly in the past few years. One of the most useful items in the fisherman's tackle box is the type of sinker which is shown in the Vironda patent 2,701,427, which is assigned to the same assignee as the present invention. Briefly, this invention comprises a round shot type sinker having a slot that extends through the sinker. This particular fishing sinker has enjoyed extreme popularity and widespread use because it can be easily attached to a fishing line by pinching the sinker around the line. Although this type of a sinker enjoys widespread popularity, there are some disadvantages to this type of sinker. For example, the line usually passes through the sinker in an off center position or the sinker's rounded stubby shape allows the sinker to catch on weeds as the sinker is pulled through the water.

Still another type of prior art attachment to fishing lines is shown in the Hribar U.S. Pat. No. 3,608,230. The Hribar patent shows a round shot sinker having a cushioning insert extending through the body of the sinker. The insert cushions and holds the line within the sinker body and prevents undue wear on the line.

Still another embodiment is shown in the Pancast U.S. Pat. No. 1,023,676 which shows a sinker comprised of a number of different members having an increasing diameter from one end to the other.

The present invention comprises an improvement to the art of sinkers by providing a sinker for attachment to a fishing line in which the ends of the sinker body are made with a converging streamlined shape and the interior of the sinker contains members to hold the fishing line in a central position with respect to the sinker.

SUMMARY OF THE INVENTION

Briefly, the present invention comprises an elongated streamlined sinker body having an opening extending therethrough. In one embodiment a hinge made from the sinker allows the two halves of the elongated sinker to be clamped around the fishing line. The sinker body contains internal members for holding the line in a central position with respect to the fishing line. Because the fishing line is symmetrically located with respect to the sinker body at all times and the sinker body has a streamlined shape, it allows the sinker to be weedless.

BRIEF DESCRIPTION OF THE DRAWING

FIG. 1 is a top view of a sinker body of my invention;

FIG. 2 is a side view taken along lines 2—2 of FIG. 1;

FIG. 3 is an enlarged view of the end of the sinker shown in FIG. 1;

FIG. 4 is an end view of one embodiment of a sinker;

FIG. 5 is an alternate embodiment of one end view of a sinker;

FIG. 6 is an end view of a further alternate embodiment of a sinker;

FIG. 7 is a top view showing a line attachment member of a sinker;

FIG. 8 is a bottom view of the embodiment shown in FIG. 7;

FIG. 9 is a top view of an alternate embodiment of a sinker without a hinge;

FIG. 10 is a cross-sectional view of a further embodiment of a sinker; and

FIG. 11 is an end view of the sinker shown in section in FIG. 10.

DESCRIPTION OF THE PREFERRED EMBODIMENT

Referring to FIGS. 1-4, reference numeral 10 generally designates an elongated one piece lead fishing sinker having two half members 12 and 13 which are held together by lead hinges 11. In the present embodiment the use of lead as the hinge allows the sinker to be opened and closed around a fishing line. A line 14 is shown passing through the sinker and is clamped and held in place by line gripping members located on the ends of member 12 and member 13.

FIG. 2 reveals the interior of sinker 10 and FIG. 3 reveals the detail of the line gripping members which are located at the ends of sinker 10. Located at one end of sinker 10 are line gripping members 20, 21 and 22 which coact to lock line 14 in sinker 10. Similarly located at the opposite end (FIG. 2) are line gripping members 31 and 32 and a third member (not shown) which coact to lock the line on the opposite end of sinker 10. Located in the central portion of sinker 10 are line pressure pads 37 and 38 (FIG. 4). Pressure pads 37 and 38 hold the line within the body of sinker 10. In order to open and close sinker 10, a recess region 17 is located in half member 12 and a recess region 18 is located in half member 13. These recess regions allow a user to insert his thumbnails to pry half members 12 and 13 apart.

FIGS. 5 and 6 show alternate embodiments of the invention in which there is provided an elongated triangular slot 41 that extends upward to substantially the top of sinker 10. FIG. 6 shows a smaller triangular slot 42 which extends only partially upward from a central axis of the sinker. With the embodiment shown in FIG. 6, the line is firmly held in a central position with respect to the sinker.

Referring to FIGS. 7, 8 and 9, an alternate embodiment 50 is shown in which line gripping members 53 and 54 are formed by a step pattern formed by the top half 49 and bottom half 48. Interlocking members 53 and 54 can be locked around a line as can be the members 22, 21 and 20, however, these fastening members extend through the sinker.

The embodiment of FIGS. 7 and 8 allows for the unit to be clasped firmly along the entire length of fishing line which is located in the sinker. Located on the ends of lead sinker 50 are lead hinges 58 and 59 and a slot 60 extends through the sinker. A first recessed finger area 51 is located on one half of sinker 50 and a second recessed finger area 52 is located on the other half of sinker 50. To open sinker 50 an operator presses on the recessed finger areas which separate members 48 and 49.

Referring to FIG. 9, an alternate embodiment is shown in which the configuration of the line gripping members of the sinker is the same as shown in FIGS. 7 and 8 except hinges 59 and 58 have been removed and replaced by a first snap ring 61 and a second snap ring (not shown) which fits into the circular groove 68.

These snap rings hold the line in a secure position in the sinker as well as hold the two halves 62 and 63 together.

FIG. 10 shows a cutaway view of an alternate embodiment of the invention in which hinge 75 extends the entire length of sinker 70. Located on sinker 70 are pressure pads 71 and 72 which have counterparts in the opposite half of the sinker (not shown) to firmly hold a line within sinker 70. Located at one end of the sinker 70 are line grasping members 79 and 80 and located at the opposite end are line grasping members 76 and 77 for pressure engaging the line against the opposite half of sinker 70 which contains line grasping members (not shown). FIG. 11 shows sinker 70 in the open position ready to receive a fishing line.

I claim:

1. An elongated, one-piece streamlined fishing sinker adapted for attachment to a fishing line or the like comprising:

a first solid member having a surface with an elongated streamlined shape, a second solid member having a surface with an elongated streamlined shape, said first solid member and said second solid member operable for mating together to produce a fishing sinker having a middle and two ends, said middle of said fishing sinker being substantially larger than either end, said middle having a cylindrical cross section, said first solid member and said second solid member when mated together are operable for defining a fishing sinker for holding a fishing line in the water, said first solid member and said second solid member coacting to provide an elongated streamlined shaped fishing sinker to minimize entanglement of said fishing sinker with weeds located in a lake;

said first solid member and said second solid member including a first hinge integrally formed to one end of said first solid member and said second solid member and a second hinge integrally formed to the opposite end of said first solid member and said second solid member, said first and said second hinges operable for resiliently holding said first member in pressure contact with said second member, said hinges having sufficiently small area so that a user can open said sinker with thumbnail force;

means for holding said first solid member in pressure contact with said second solid member so that said first solid member and said second solid member form a fishing sinker which cannot be separated without an application of an external force;

a first fishing line confining means located partially on one end of said first solid member and partially on one end of said second member, said first fishing line confining means comprising a set of gripping members which when closed together produce a confinement of the fishing line with respect to said first solid member and said second solid member so that confinement of the fishing line is obtained by the coaction of said first solid member and said second solid member to thereby symmetrically hold the fishing line in one end of said fishing sinker;

a second line confining means located partially on the opposite end of said first member and partially on the opposite end of said second member, said second line confining means comprising a set of gripping members which when closed together produce a confinement of the fishing line with respect to said first solid member and said second solid member so that confinement of the fishing line is obtained by the coaction of said first solid member and said second solid member to thereby symmetrically hold the fishing line in the opposite end of said fishing sinker, said first line confining means and said second line confining means coacting to hold a fishing line in a symmetrical position with respect to said fishing sinker;

a line gripping means located on said first solid member and said second solid member, said line gripping means comprising a first pressure pad that extends from said first member, a second pressure pad that extends from said second member, said first pressure pad and said second pressure pad extending lengthwise along said sinker for sufficient distance to provide an area on each of said first pressure pad and said second pressure pad which is operable for forming pressure engagement with a portion of the fishing line located intermediate said first line confining means and said second line confining means so that when said first solid member and said second solid member are in a closed position said first pressure pad and said second pressure pad are operable to securely squeeze the fishing line therebetween and thereby provide a resistance to the fishing line slipping intermediate of said first line confining means and said second line confining means. said first pressure pad and said second pressure pad are operable to securely squeeze the fishing line therebetween and thereby provide a resistance to the fishing line slipping intermediate of said first line confining means and said second line confining means.

* * * * *